(12) United States Patent
Jones et al.

(10) Patent No.: US 7,325,186 B2
(45) Date of Patent: Jan. 29, 2008

(54) METHOD AND SYSTEM FOR SHOWING UNANNOTATED TEXT NODES IN A DATA FORMATTED DOCUMENT

(75) Inventors: Brian Jones, Redmond, WA (US);
Robert Little, Redmond, WA (US);
Marcin Sawicki, Kirkland, WA (US);
Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 10/377,581

(22) Filed: Feb. 28, 2003

(65) Prior Publication Data

US 2004/0172594 A1 Sep. 2, 2004

(51) Int. Cl.
*G06F 15/00* (2006.01)
*G06F 17/00* (2006.01)

(52) U.S. Cl. ............... 715/513; 715/501.1; 715/517
(58) Field of Classification Search ............ 715/501.1, 715/513, 517
See application file for complete search history.

(56) References Cited

U.S. PATENT DOCUMENTS

| | | | |
|---|---|---|---|
| 6,681,370 B2 | 1/2004 | Gounares et al. | 715/513 |
| 6,721,727 B2 | 4/2004 | Chau et al. | 707/3 |
| 6,779,154 B1 | 8/2004 | Nussbaum et al. | 715/523 |
| 2002/0038320 A1* | 3/2002 | Brook | 715/513 |
| 2002/0147748 A1* | 10/2002 | Huang et al. | 707/517 |
| 2002/0161801 A1* | 10/2002 | Hind et al. | 707/513 |
| 2003/0041076 A1 | 2/2003 | Lucovsky et al. | 707/500 |
| 2003/0071782 A1 | 4/2003 | Martinez | 345/156 |
| 2005/0022115 A1* | 1/2005 | Baumgartner et al. | 715/513 |

FOREIGN PATENT DOCUMENTS

CA WO 94/14122 * 6/1994

OTHER PUBLICATIONS

Microsoft Press Computer Dictionary, 3rd Edition, 1997 Microsoft Corporation, printout pp. 1-5.*
D. Greenwood, "XMetal 3 Overview," Online publication, Dec. 21, 2002, XP-002364996, http://web.archive.org/web/20021221172046/http://www.online-learning.com/papers/EditorsReport/XmetalOverview.html.

(Continued)

*Primary Examiner*—William Bashore
(74) *Attorney, Agent, or Firm*—Merchant & Gould

(57) ABSTRACT

Methods and systems provide a tree view showing unannotated text nodes in a corresponding data formatted document. When the user begins to annotate the document with a desired data format structure, such as a markup language like XML, a tree view pane is displayed to the user to provide the user with an outline of the data structure presently applied to the document or to provide the user with an outline of the data structure applied to the document as the user annotates the document with data structure. In the tree view, an indicator is displayed in the location of any unannotated text nodes relative to their sibling data elements. If the user focuses on a given unannotated text node indicator in the tree view, the corresponding text node in the corresponding document is highlighted to the user to show the user the location of the text node that has not been annotated with data structure.

34 Claims, 4 Drawing Sheets

OTHER PUBLICATIONS

D. Greenwood, "FrameMaker Structure View," Online publication, Dec. 21, 2002, XP-002364999, http://web.archive.org/web/20021221172825/http://www.online-learning.com/papers/EditorsReport/FMStructureView.html.

Michel Rodriguez et al., "XML In WordPerfect 9: A Users's View," Online publication, May 31, 2000, XP-002364998, http://www.xml.com/pub/a/2000/05/31/wordperfect/index2.html.

D. Greenwood, "FrameMaker Elements and Attributes," Online publication, Dec. 21, 2002, XP-002364997, http://www.online-learning.com/papers/EditorsReport/FMElementAtributes.html.

Luke McDowell et al., "Evolving the Semantic Web with Mangrove," Technical Report of the University of Washington, Online publication, Feb. 1, 2003, XP-002365000, http://norfolk.cs.washington.edu/htbin-post/unrestricted/tr/list.cgi?sortby=date.

* cited by examiner

METHOD AND SYSTEM FOR SHOWING UNANNOTATED TEXT NODES IN A DATA FORMATTED DOCUMENT

FIELD OF THE INVENTION

This invention relates to methods and systems for showing unannotated text nodes in a data formatted document.

BACKGROUND OF THE INVENTION

Computer software applications allow users to create a variety of documents to assist them in work, education, and leisure. For example, word processing applications allow users to create letters, articles, books, memoranda, and the like. Spreadsheet applications allow users to store, manipulate, print, and display a variety of alphanumeric data. Such applications have a number of well-known strengths, including rich editing, formatting, and calculation.

To keep up with demand for more advanced functionality for such computer software applications, software developers have begun to use structured data formats, including markup languages, such as Extensible Markup Language (XML), to allow users to annotate a software application document to give the document a useful structure apart from the normal functionality of the software application responsible for creating the document or the visible formatting associated with the document. For example, a user may wish to create on her word processing application a template document for preparation of a resume, a will, or an article that she wishes to transmit to a publisher. By applying structure to the document, persons or institutions receiving the document may make use of the structure by processing the document to utilize data defined by the document structure.

Some word processing applications allow users to annotate a word processing document with XML elements so that the user may define certain data types and data definitions for data inserted into the document. A resume document, for example, may include an "Experience" section in which the user will include present and past work experience. Using XML, the user may desire to mark up the "Experiences" section of the document to define that certain allowable information in a prescribed order in a prescribed number may be included in the Experiences section of the document. For example, the user may wish to mark up the Experiences section of the document to contain four present or past Experience items.

Unfortunately, most users of such computer software applications do not have the requisite understanding of markup languages, such as XML, to correctly apply allowable markup language elements to a document. In particular, some markup languages, such as XML, have rules that dictate allowable markup structure that may be applied to a document. According to many XML schemas, mixed content is either not allowed or creates an error condition for the user. That is, if the user applies a parent XML element in which the user applies a number of child XML elements, the user may not be permitted to include data or text nodes not marked up with structure within the parent element structure where the data or text nodes have a sibling element that has been properly marked up with XML structure. For example, a resume document may be marked up with structure pertaining to the Experience section of the resume. The Experience section may be annotated with a parent element called <experience>. Within the Experience section, child elements called <employer 1>, <employer 2>, and <employer 3> may be included to add structure within the overall experience structure. If the user includes data that is not marked up with data structure, for example, "dates of employment" between the <employer 1> and the <employer 2> elements, the "dates of employment" data is considered an unannotated or unstructured sibling element of the Employer 1 and Employer 2 elements.

According to many Data formats, like XML, this creates a mixed content situation because data is included within the data structure but it has not been annotated with structure of its own and that is not a part of neighboring data it is associated with structure. Even if the data format version in use by a given user allows such a mixed content situation, the user may not be aware that she has failed to annotate the unannotated data with proper structure. If it is acceptable to the user and to the data format version in use by the user to leave this data unannotated, the user may choose to do so but may have a difficult time locating the unannotated data in the document. Accordingly, there is a need for a method and system for showing unannotated text nodes in a document to allow users to know the location and context of the unannotated data.

It is with respect to these and other considerations that the present invention has been made.

SUMMARY OF THE INVENTION

Embodiments of the present invention provide methods and systems for providing a data tree view showing unannotated text nodes in a corresponding document. A user of a computer-generated document such as a word processing document associates a schema with a document setting out the data types, annotation rules and procedures for which the document may be annotated with data format for structuring portions of the document. According to one aspect of the invention, the user attaches a schema to the document presetting the data types, data structures and elements rules for the document so that the user may annotate the document with data format structure. Alternatively, the user may receive a document that has a schema attached to or associated with the document.

When the user begins to mark up the document with a desired data format, such as XML structure, a tree view pane is displayed to the user to provide the user with an outline of the element structure presently applied to the document or to provide the user with an outline of the structure applied to the document as the user annotates the document with structure. According to one aspect of the invention, the structure outline provided to the user is a tree view showing parent data structure elements and associated child and sibling data elements. The tree view structure provided to the user shows each child and sibling element in order relative to each other and relative to the parent element as those elements are ordered and associated in the corresponding document being annotated by the user.

During the display of the tree view, a determination is made as to whether any text nodes in the corresponding document are unannotated with structure, but that have sibling elements within the document. When the tree view is displayed, the names of parent elements are displayed followed by the names of the child elements in the order in which those child elements correspond to the parent element in the document. In the tree view, an indicator, such as an ellipsis ( . . . ), is displayed in the location of any unannotated text nodes relative to their sibling elements. Alternatively, the value of the text node may be displayed in the location of any unannotated text nodes relative to their sibling elements. According to one aspect of the invention, an additional help pane may be provided to provide the user with a list of suggested data elements, such as XML elements, that may be used to apply to the unannotated text nodes.

If the user focuses on a given unstructured text node indicator in the tree view, the corresponding text node in the corresponding document is highlighted to the user to show the user the location of the text node that has not been annotated with structure. Accordingly, the user is alerted to the existence and location of an unannotated or unstructured text node and the user may navigate to the position of the unannotated text node in the document by selecting the unannotated text node indicator (for example, an ellipsis or text node value) in the corresponding tree view. Once the user locates the unannotated text node and highlights the data contained in the unannotated text node, the user may select one of the suggested data structure elements for the unannotated text node, and the unannotated text node will be automatically annotated with the selected element structure. Alternatively, the user may manually insert desired structure, or the user may decide not to add structure to the text node.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

The following description of embodiments of the present invention is made with reference to the above-described drawings wherein like numerals refer to like parts or components throughout the several figures. The present invention is directed to methods and systems for showing the location and relation of unannotated text nodes in a data formatted document, such as a markup language document like XML.

Operating Environment

Figure 1:
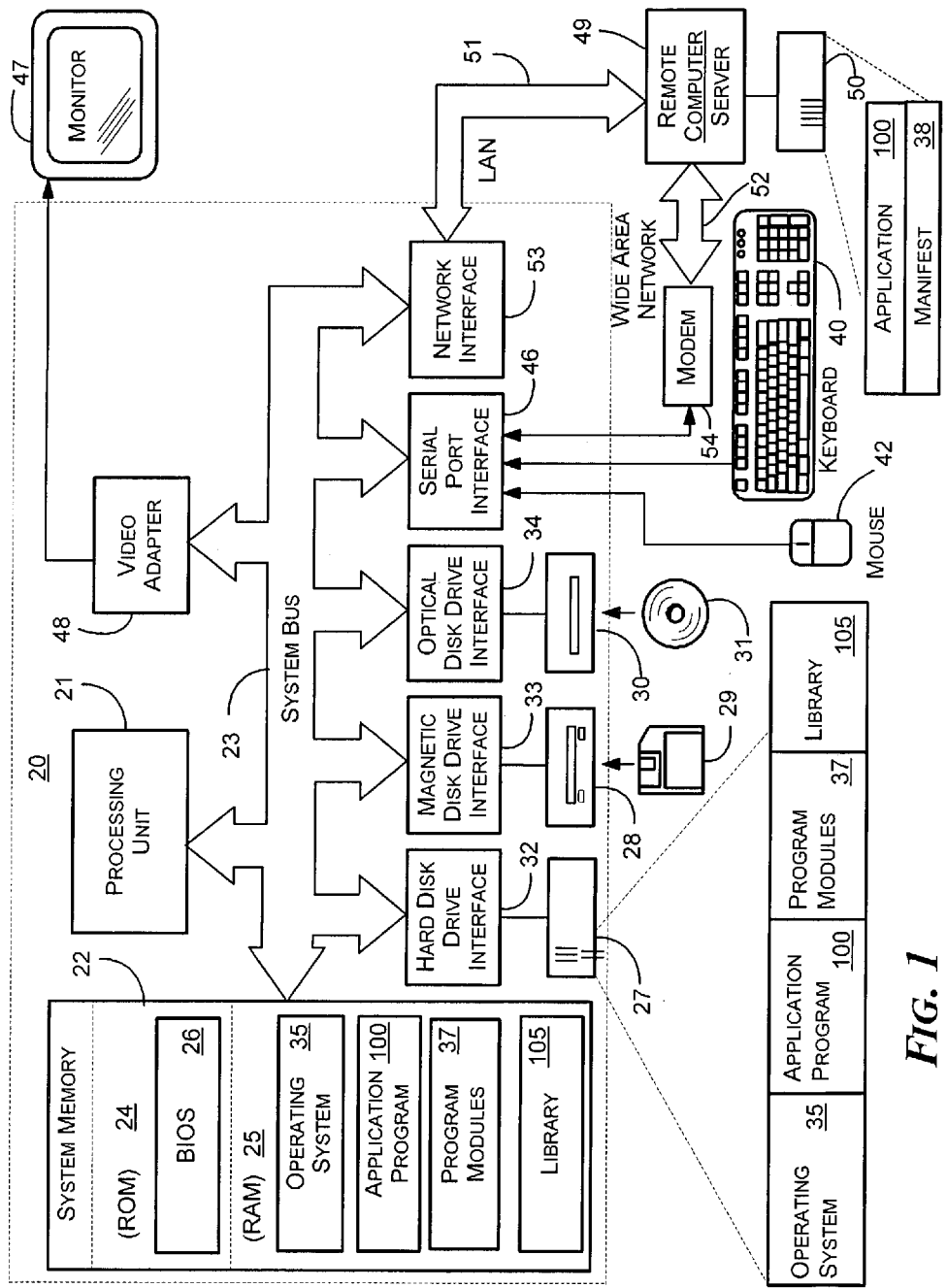
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally., program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
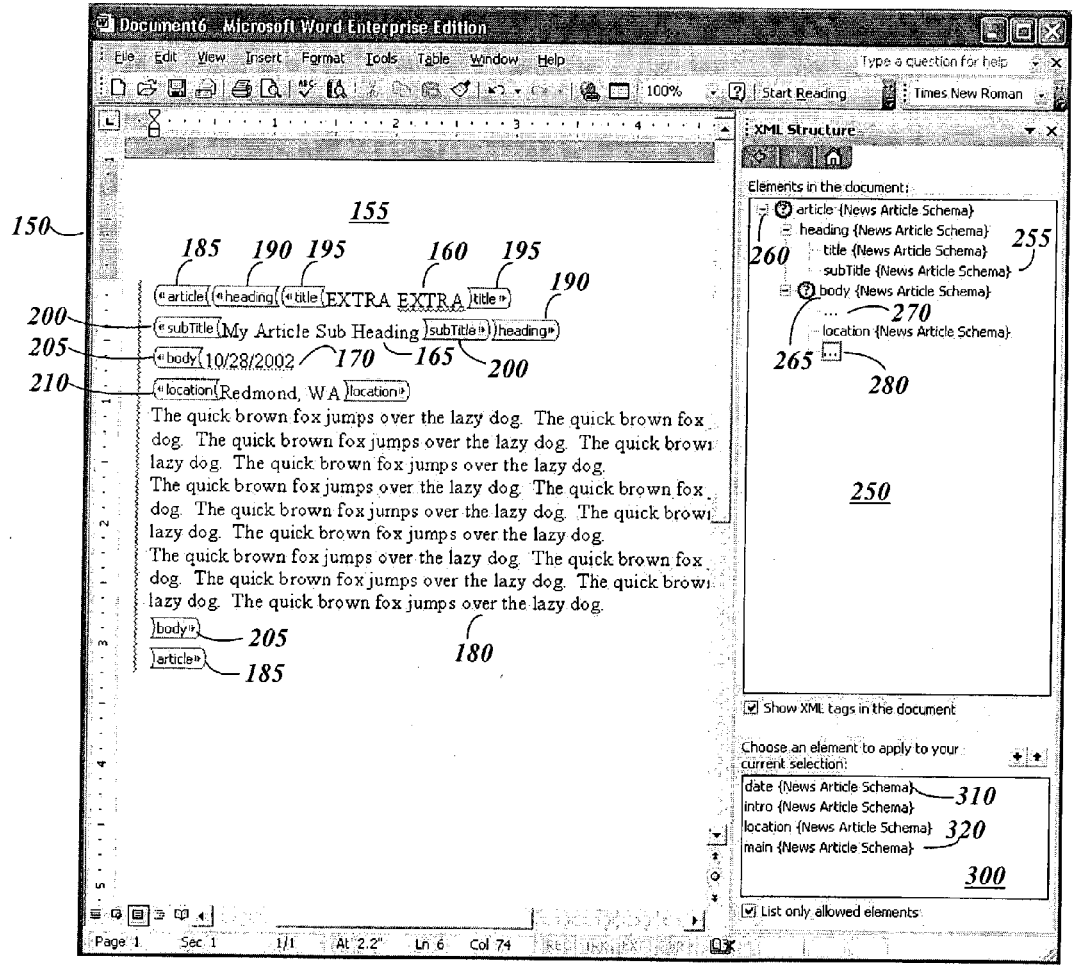
FIG. 2 illustrates a computer screen display of a software application for creating a document and annotating the document with data format structure and showing an associated tree view.

As shown in FIG. 2, an illustrative software application screen display 150 is illustrated. The screen displayed in display 150 is illustrative of a variety of software application screen displays such as a word processor display, a spreadsheet display, web browser display, and the like. The screen display 150 shows an exemplary word processor application display having a workspace 155 for entry and editing of the document. According to the illustrated example in FIG. 2, an article document is being created by a user having an article title 160 and an article subtitle 165. As should be understood by those skilled in the art, the text illustrated in FIG. 2 is for the purposes of example only, and the data entered into the work space 155 may be in any type of format including alphanumeric text and images allowable by the software application under which the document is created.

As shown in the work space 155, a number of data format structural elements are shown annotating the document. The data format illustrated in FIG. 2 is according to the Extensible Markup Language. It should be understood that the XML structure illustrated in FIG. 2 is by way of example as the functionality of the present invention is equally applicable to any data format for showing a user the data structure of a document to which data formatting is applied. For example, the <article> tag 185 is included at the beginning and end of the document to define the document as an "article" document, and a variety of other elements such as a <body> element 205 and a <location> element 210 are included inside the "article" structure. As is well-known to those skilled in the art, XML annotation of the document allows the user to define portions of the document with certain types of data and data structure. For example, the user may define the portion of the document inside the <title> element 195 for including data of the type "title" and including a prescribed allowable structure for the title.

In order to provide the document with a set of grammatical rules governing the types and structure of data that may be included in a given document such as the "article" document illustrated in FIG. 2, a schema is attached to or associated with the document for providing the rules governing each of the data structure elements and tags with which a user may annotate a given document. For example, the "article" document may have an attached or associated schema file such as "article-schema.xsd" for providing the allowable set of XML elements such as <article> element, <title> element, <body> element, and so on. The schema file includes the rules governing the order with which those elements may be applied to a document and specific rules associated with individual elements applied to the document. For example, a schema attached to or associated with the "article" document, illustrated in FIG. 2, may prescribe that data associated with a given element, for example an date element, must include a day element, followed by a month element, followed by a year element. Additionally, the schema may require that data associated with a date element must immediately precede the <location> element 210.

As is understood by those skilled in the art, developers of XML schema files determine the names of XML elements and the associated data types and data structures allowed for those elements. Then, all users of documents annotated with XML structure according to a given schema file may utilize the data contained within the XML structure without regard for the overall type and structure of the document. For example, if the "article" document, illustrated in FIG. 2, is transmitted to a publisher of the document, the publisher may develop software applications for parsing the document to locate specific types of data within the document for use by the publisher. The publisher may, for example, only wish to publish the title of the article as an advertisement for the future publication of the whole article. Using the schema file attached document, the publisher will know that the data associated with the XML element <title> element has been prepared according to the schema file governing the document. Accordingly, the publisher may develop a software application for locating the <title> element and for extracting the data associated therewith for insertion into the publisher's own document for using that data as an advertisement for the future publication of the whole article.

The publisher may extract this data without regard to other aspects of the document such as the location of and data contained within the "body" section. This is made possible by the fact that each user of the document follows the data type and data structure rules prescribed in the schema file attached to or associated with the document. The schema file may be attached to the document, or the schema file may be maintained in a separate location such as a library of schema files accessible by the document. That is, the document may contain a file path pointer or a unique name space identifier (e.g., URI or URN) for locating and/or identifying the schema file for providing the document rules governing the XML structure of the document. Referring still to FIG. 2, the <article> tag 185 illustrates a parent tag for the XML structure being annotated on to the document. The elements such as the <heading> element 190, the <body> element 205 illustrate child elements within the overall "article" structure in relation to the tag 185. The <title> element 195 and the <subtitle> element 200 illustrate child elements of the <heading> element 190. Likewise, the <location> element 210 illustrates a child element of the <body> element 205.

As stated above, as should be understood by those skilled in the art, embodiments of the present invention are not restricted to the showing of annotation of a document with Extensible Markup Language structure. Embodiments of the present invention may likewise be used for adding annotation to any document using any other type of data formatting language or system, such as Hypertext Markup Language (HTML) and the like. That is, the embodiments of the present invention may be utilized to show a tree view of other types of markup language elements, such as HTML elements, along with corresponding indicators where elements have not been properly applied or are otherwise missing as a way of alerting the user of the error or as a way of allowing the user to navigate to the text or data associated with the erroneous markup.

As shown in FIG. 2, two text nodes "Oct. 28, 2002" 170 and "the quick brown fox . . ." 180 are included in the document, but have not been annotated with structure. Inclusion of unannotated or unstructured data within the otherwise annotated document represents a mixed content document. According to the rules of many schemas, unannotated text nodes 170 and 180 violate the schema rules because they are located in a structure having sibling structural elements. For example, as illustrated in FIG. 2 the text nodes 170 and 180 are located within the structure of the <body> element 205, and the sibling <location> element 210 is located between the unannotated text nodes 170 and 180. According to many schemas, mixed content is either not allowed or creates an ambiguity for the editing program module because the unannotated data may not be operated on by the data structure editing programming module. From a user standpoint, the unannotated data may represent data that the user had intended to annotate, but erroneously failed to annotate properly, or the data may represent data that the user has intentionally failed to annotate, but the user is unable to readily locate the data in the document in the absence of structure to assist the user in navigating to the data. For example, the user may only desire to annotate the topic sentence of paragraphs contained in the article document illustrated in FIG. 2, but the user intentionally desires not to annotate the remaining sentences in each paragraph. Without the assistance of data structure to the unannotated sentences in each of such paragraphs, the user may find it difficult to readily navigate to those sentences.

According to an embodiment of the present invention, a tree view pane 250 is provided to the user for showing the user in outline form the data formatting, such as XML tags and elements, that has been applied to the document in an order and location relative to each other. For example, as shown in FIG. 2, the <article> tag is shown having the <heading> element as a child of the <article> tag. The <title> element and the <subtitle> element are shown as child elements of the <heading> element. The <body> element is shown as a child element of the <article> tag and the <location> element is shown as a child element of the <body> element. According to an embodiment of the present invention, an unannotated text node indicator 270 and an unannotated text node indicator 280 are shown in the tree view pane 250 as child elements of the <body> element 265. The indicators 270 and 280 represent the unannotated text nodes 170 and 180 of the corresponding document. Additionally, based on the position of the indicators 270 and 280 relative to the <location> element, a visual illustration is provided showing that the text nodes indicated by the indicators 270 and 280 have a sibling element, namely the <location> element 210. According to an embodiment of the present invention, and as illustrated in FIG. 2, the indicators 270 and 280 are ellipses ( . . . ) included on the tree view in the location that otherwise properly annotated elements for the text nodes 170 and 180 would reside if those text nodes were properly annotated with data formatting structure.

Alternatively, the value of the text node may be included on the tree view in the location that otherwise properly annotated elements for the text nodes 170 and 180 would reside if those text nodes were properly annotated with data structure. For example, if the value of an unannotated text node is "John Doe," instead of showing an ellipsis ( . . . ) in the tree position for the text node, the actual value, for example, "John Doe," may be presented in the tree. For the sake of presentation, the value may be formatted to distinguish it from other information, such as by italicizing or boldfacing the value (e.g., John Doe).

If the user selects the indicator 270 or indicator 280, the text in the corresponding document associated with the selected indicator is highlighted in the document, thus showing the user the location of the unannotated text node corresponding to the indicator 270 or 280. If the indicator alerts the user of a text node that should be annotated with data formatting structure, the user may select the corresponding indicator as a method of immediately navigating to the location of the text node in order to apply structure to that text node. On the other hand, if the user does not wish to apply structure to the unannotated text node, the user may nonetheless utilize the functionality of the present invention to navigate to the text node by selecting the corresponding indicator 270 or 280. As should be understood by those skilled in the art, a user may select the indicator according to a variety of methods including placing the user's cursor over the desired indicator 270 or 280 and selecting that indicator. Alternatively, the user may focus on the desired indicator 270 or 280 with the user's mouse indicator and click on the appropriate indicator.

Referring still to FIG. 2, a suggested structure pane 300 is provided for offering the user suggested structure for applying to the unannotated text nodes. As should be understood by those skilled in the art, the suggested structure provided in the pane 300 is based on the schema attached to the document. For example, the pane 300 includes a <date> element 310 and a <main> element 320. According to an exemplary schema that may dictate acceptable structure for annotating the article document illustrated in FIG. 2, a <date> element and a <main> element may be prescribed. Accordingly, because the document illustrated in FIG. 2 has not been annotated with a <date> element or a <main> element, those elements are provided in the pane 300 to provide the user with helpful information as to structure that may be applied to the document according to the associated schema. The user may select an unannotated text note 170 by selecting the indicator 270 as described above. Once the user selects the indicator 270, the text node 170 including the date "Oct. 28, 2002" is highlighted for the user. If the user desires to apply the date element 310 to the text node 170, the user may enter the body of the article and manually annotate the date text node with a <date> element. Alternatively, once the user has highlighted the text node 170 by selecting the indicator 270, the user may select the <date> element 310 from the suggested structure pane 300 and the text node 170 will be automatically annotated with that element.

Figure 3:
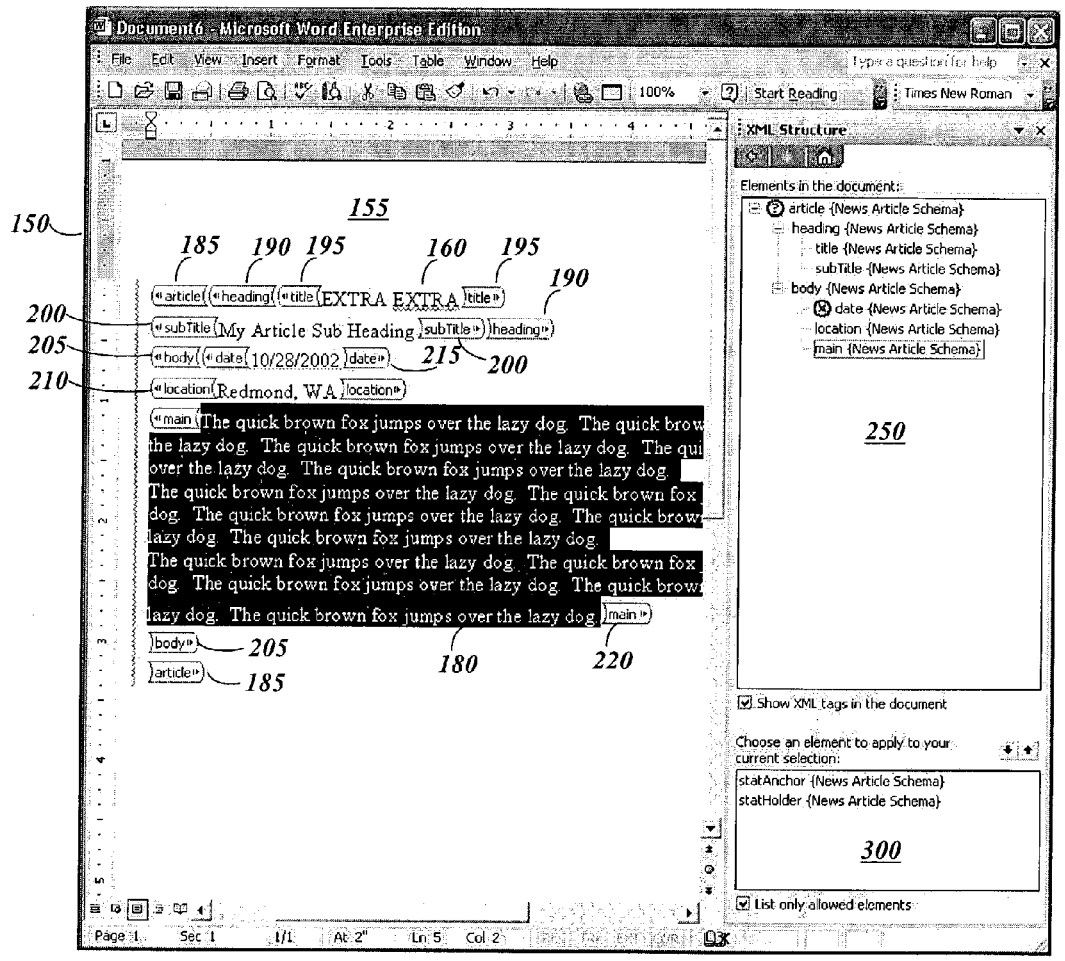
FIG. 3 illustrates the computer screen display of FIG. 2 showing the annotation of an unannotated text node illustrated in FIG. 2.

Referring now to FIG. 3, the text nodes 170 and 180 are shown after the user has annotated those text nodes with data formatting structure, as described above with reference to FIG. 2. The date text node 170 is illustrated in FIG. 3 contained within a <date> element 215 and the text node 180 is shown within a <main> element 220. As shown in the tree view pane 250, once the unannotated text nodes have been annotated with structure, the corresponding tree view is changed to show the <date> element and <main> elements applied to the text. In comparison to the illustration shown in FIG. 2, the indicators 270 and 280 in the tree view pane 250 are replaced with the names for the <date> element and <main> element. Accordingly, a quick viewing of the tree view pane 250 now shows the current element structure and shows the user that no unannotated text nodes persist in the document.

Figure 4:
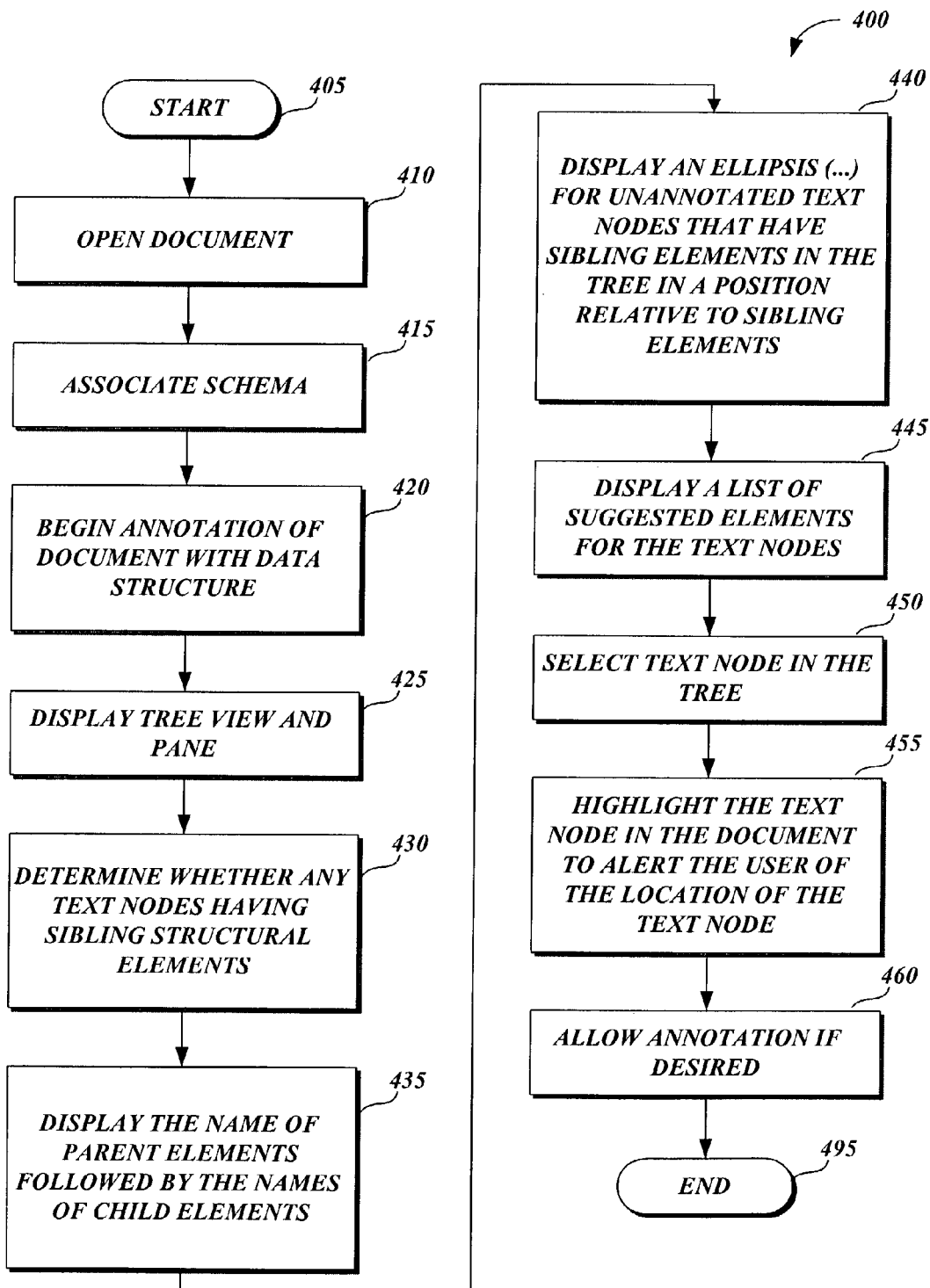
FIG. 4 is a flow chart illustrating a method for showing the location of unannotated text nodes in an data formatted document.

FIG. 4 is a flow chart illustrating a method for showing the location of unannotated text nodes in a data formatted document. By way of example only, FIG. 4 is described with reference to the illustrative article document marked up with XML structure illustrated in FIGS. 2 and 3. As should be understood, the description of FIG. 4 is equally applicable to any document for which the user desires to annotate with a markup language, such as XML, according to the embodiments of the present invention.

The method 400 begins at start step 405 and proceeds to step 410 where the user opens the document such as the document illustrated in FIGS. 2 and 3. At step 415, a user desiring to annotate the document with data structure obtains the schema file associated with the document. As should be understood, the article document being edited by the user may have an associated schema file that is already attached to or associated with the document such that the document includes a file path pointer to the schema file to obtain the use of the schema file for governing structural annotation of the document. Alternatively, the user may have received the document without an associated schema file or the user may have created the article document as an original document, and a schema file may not yet exist. If a schema file is not already attached to the document, or if the document does not reference a schema name space that the application creating the document is aware of, the user does not need to obtain an appropriate schema file or create a schema file. The application creating the document, for example a word processor, will be able to show the user via the pane 250 the appropriate structure of the document including the lack of annotation on an unannotated text node 170 or 180. The application will not, however, have the ability to validate the tree and guarantee the proper structure is maintained without a schema file At step 420, the user begins to annotate the document with data stucture elements so that subsequent users of the document may utilize data contained in the document in accordance with the data structure with which the user annotates the document. For example, if the user is preparing the article document for a publisher, the user may require that the document be annotated according to a particular schema file so that the publisher may quickly and easily extract the required data from the document after the document is transmitted to the publisher from the user. At step 425, the tree view pane 250 is provided to the user either automatically, or alternatively, by selection by the user.

At step 430, a determination is made as to whether any unannotated text nodes 170 or 180 in the document have sibling elements such as the <location> element 210. At step 435, the tree view is displayed with the names of existing parent and child elements currently applied to the document. At step 440, indicators 270 and 280 (for example, an ellipsis ( . . . )) are provided to the user to indicate the existence and location of unannotated text nodes 170 and 180 in the position of those text nodes relative to other structure in the document.

At step 445, a list of suggested structural elements is provided in the pane 300 for potential application to the unannotated text nodes 170 and 180. At step 450, the user may select the text node indicator 270 or 280 in order to navigate to the associated text node within the document. At step 445, the text node associated with the indicator 270 or 280 selected by the user is highlighted in the document to alert the user of the location of the text nodes for purposes of navigation or to allow the user to apply an element to the unannotated text node. At step 460, the user may annotate the highlighted text node. The method ends at step 495.

As described above, methods and systems are provided for showing unannotated text nodes in a markup language document to alert a user of the existence and location of the unannotated text nodes. It will be apparent to those skilled in the art that various modifications or variation may be made in the present invention without departing from the scope or spirit of the invention. Other embodiments of the invention will be apparent to those skilled in the art from consideration of the specification and practice of the invention disclosed herein.

We claim:

1. A computer readable medium having stored thereon computer-executable instructions which when executed by a computer, perform:

attaching a schema to a document, the schema defining rules associated with a data format to be applied to the document, the rules being associated with elements of the data format;

annotating the document with the elements of the data format wherein annotating the document comprises;

reading the schema to determine the rules associated with applying the elements of the data format to the document, annotating a first element of the elements, and in response to annotating the first element of the elements, annotating a second element of the elements, wherein the second element follows a rule governing the order that the first and second elements are applied to the document;

displaying a tree view outline showing the data format elements applied to the document;

validating the tree view outline with the schema to determine whether the document is annotated with the data format elements according to the schema; and displaying, via the tree view outline, an unannotated text node indicator, wherein the unannotated text node indicator represents a text node in the document unannotated with a data format element, data in the text node being unannotated and non-operable by a data structure editing programming module, wherein unannotated data includes data that is not marked with a data structure.

2. The computer readable medium of claim 1 having stored thereon computer-executable instructions which when executed by a computer, further perform the step of:

displaying the unannotated text node indicator in a position on the tree view outline relative to the displayed data format elements on the tree view outline indicative of the position of the unannotated text node in the document relative to the positions of annotated text nodes in the document.

3. The computer readable medium of claim 2 having stored thereon computer-executable instructions which when executed by a computer, further perform the steps of:

selecting the unannotated text node indicator in the tree view outline; and in response to selecting the unannotated text node indicator, highlighting the corresponding unannotated text node in the document.

4. The computer readable medium of claim 3 having stored thereon computer-executable instructions which when executed by a computer, prior to the step of displaying via the tree view outline an unannotated text node indicator, further perform:

parsing the document to determine whether any unannotated text nodes exist in the document; and if an unannotated text node exists in the document, then determining the location in the document of the unannotated text node.

5. The computer readable medium of claim 4 having stored thereon computer-executable instructions which when executed by a computer, further perform:
determining whether the unannotated text node requires annotation according to rules associated with the data format.

6. The computer readable medium of claim 3, whereby the step of highlighting the unannotated text node in the document includes highlighting the unannotated text node in the document to locate the unannotated text node in the document.

7. The computer readable medium of Claim 6 having stored thereon computer-executable instructions which when executed by a computer, further perform:
displaying the tree view outline in a tree view outline pane.

8. The computer readable medium of claim 1 having stored thereon computer-executable instructions which when executed by a computer, further perform:
determining whether the unannotated text node has any sibling annotated elements, wherein the unannotated text node and the sibling annotated elements have a common parent element.

9. The computer readable medium of claim 1 having stored thereon computer-executable instructions which when executed by a computer, further perform:
displaying via the tree view outline a name of each parent data format element applied to the document.

10. The computer readable medium of claim 9 having stored thereon computer-executable instructions which when executed by a computer, further perform:
displaying via the tree view outline a name of each child data format element applied to the document in a position on the tree view outline relative to a parent data format element of each child data format element.

11. The computer readable medium of claim 10 having stored thereon computer-executable instructions which when executed by a computer, further perform:
displaying via the tree view outline the name of each child data format element applied to the document in a position relative to any sibling data format element of each child data format element.

12. The computer readable medium of claim 1 having stored thereon computer-executable instructions which when executed by a computer, further perform:
providing a list of suggested data format elements for application to the unannotated text node, wherein the list of suggested data format elements is based on rules associated with the data format.

13. The computer readable medium of claim 12 having stored thereon computer-executable instructions which when executed by a computer, further perform selecting a suggested data format element from the list of suggested data format elements.

14. The computer readable medium of claim 13 having stored thereon computer-executable instructions which when executed by a computer, further perform in response to selecting a suggested data format element from the list of suggested data format elements, automatically annotating the unannotated text node with the selected suggested data format element.

15. The computer readable medium of claim 1 having stored thereon computer-executable instructions which when executed by a computer, further perform:
annotating the unannotated text node with a data format element.

16. The computer readable medium of claim 1, whereby the data format is Extensible Markup Language (XML).

17. The computer readable medium of claim 1, whereby the data format is Hypertext Markup Language (HTML).

18. The computer readable medium of claim 1, whereby the unannotated text node indicator is an ellipsis ( . . . ) located on the tree view outline.

19. The computer readable medium of claim 1, whereby the unannotated text node indicator is the value of the text node.

20. A computer readable medium having stored thereon computer-executable instructions which when executed by a computer, perform:
annotating a document with elements of Extensible Markup Language (XML) wherein annotating the document comprises;
reading a schema to determine the rules associated with applying the elements of the XML to the document,
annotating a first element of the elements, and
in response to annotating the first element of the elements, annotating a second element of the elements, wherein the second element follows a rule governing the order that the first and second elements are applied to the document;
displaying a tree view outline showing the XML elements applied to the document; and
displaying via the tree view outline an unannotated text node indicator representing a text node in the document unannotated with a XML element, wherein the unannotated text node indicator is displayed in a position on the tree view outline relative to the displayed XML elements on the tree view outline indicative of the position of the unannotated text node in the document relative to the positions of annotated text nodes in the document, data in the text node being unannotated and non-operable by a data structure editing programming module, wherein unannotated data includes data that is not marked with a data structure.

21. The computer readable medium of claim 20 having stored thereon computer-executable instructions which when executed by a computer, further perform:
selecting the unannotated text node indicator in the tree view outline; and
in response to selecting the unannotated text node indicator, highlighting the corresponding unannotated text node in the document.

22. The computer readable medium of claim 21, whereby the step of highlighting the unannotated text node in the document includes highlighting the unannotated text node in the document to locate the unannotated text node in the document.

23. The computer readable medium of claim 20 having stored thereon computer-executable instructions which when executed by a computer, prior to the step of displaying via the tree view outline an unannotated text node indicator, further perform:
parsing the document to determine whether any unannotated text nodes exist in the document;
if an unannotated text node exists in the document, determining the location in the document of the unannotated text node; and
determining whether the unannotated text node requires annotation according to rules associated with XML.

24. The computer readable medium of claim 20 having stored thereon computer-executable instructions which when executed by a computer, further perform:
- determining whether the unannotated text node has any sibling XML elements, wherein the unannotated text node and the sibling XML elements have a common parent XML element.

25. The computer readable medium of claim 20 having stored thereon computer-executable instructions which when executed by a computer, further perform:
- displaying via the tree view outline a name of each parent XML element applied to the document.

26. The computer readable medium of claim 25 having stored thereon computer-executable instructions which when executed by a computer, further perform:
- displaying via the tree view outline a name of each child XML element applied to the document in a position on the tree view outline relative to a parent XML element of each child XML element; and
- displaying via the tree view outline the name of each child XML element applied to the document in a position relative to any sibling XML element of each child XML element.

27. The computer readable medium of claim 20 having stored thereon computer-executable instructions which when executed by a computer, further perform:
- providing a list of suggested XML elements for application to the unannotated text node, wherein the list of suggested XML elements is based on rules associated with XML.

28. The computer readable medium of claim 27 having stored thereon computer-executable instructions which when executed by a computer, further perform selecting a suggested XML element from the list of suggested XML elements.

29. The computer readable medium of claim 28 having stored thereon computer-executable instructions which when executed by a computer, further perform in response to selecting a suggested XML element from the list of suggested XML elements, automatically annotating the unannotated text node with the selected suggested XML element.

30. The computer readable medium of claim 20 having stored thereon computer-executable instructions which when executed by a computer, further perform:
- annotating the unannotated text node with an XML element.

31. The computer readable medium of claim 20 having stored thereon computer-executable instructions which when executed by a computer, prior to the step of annotating the document with XML elements, further perform:
- attaching an XML schema to the document defining rules associated with XML to be applied to the document;
- after the step of annotating the document with XML elements, reading the schema to determine the rules associated with applying the XML elements to the document; and
- validating the tree view outline with the XML schema to determine whether the document is annotated with XML elements according to the schema.

32. A computer readable medium having stored thereon computer-executable instructions which when executed by a computer, perform:
- attaching a schema to a document, wherein the schema defines rules associated with a markup language to be applied to the document;
- reading the schema to determine the rules associated with applying elements of the markup language to the document;
- annotating a first element of the elements;
- in response to annotating the first element of the elements, annotating a second element of the elements, wherein the second element follows a rule governing the order that the first and second elements are applied to the document;
- displaying a tree view outline showing the markup language elements applied to the document; and
- displaying via the tree view outline an unannotated text node indicator representing a text node in the document unannotated with a markup language element, wherein the unannotated text node indicator is displayed in a position on the tree view outline relative to the displayed markup language elements on the tree view outline indicative of the position of the unannotated text node in the document relative to the positions of annotated text nodes in the document, data in the text node being unannotated and non-operable by a data structure editing programming module, wherein unannotated data includes data that is not marked with a data structure.

33. The computer readable medium of claim 32 having stored thereon computer-executable instructions which when executed by a computer, further perform the step of:
- in response to a selection of the unannotated text node indicator, highlighting the corresponding unannotated text node in the document.

34. The computer readable medium of claim 32 having stored thereon computer-executable instructions which when executed by a computer, prior to the step of displaying via the tree view outline an unannotated text node indicator, further perform:
- parsing the document to determine whether any unannotated text nodes exist in the document;
- if an unannotated text node exist in the document, determining the location in the document of the unannotated text node; and
- determining whether the unannotated text node requires annotation according to the rules associated with the markup language.

* * * * *